US007062514B2

(12) United States Patent
Harris

(10) Patent No.: US 7,062,514 B2
(45) Date of Patent: Jun. 13, 2006

(54) CONSTRUCTION PROJECT SUBMITTAL MANAGEMENT

(76) Inventor: Elbert Harris, 11436 Canterbury Cir., Leawood, KS (US) 66211-2935

( * ) Notice: Subject to any disclaimer, the term of this patent is extended or adjusted under 35 U.S.C. 154(b) by 54 days.

(21) Appl. No.: 10/693,590

(22) Filed: Oct. 24, 2003

(65) Prior Publication Data

US 2004/0215633 A1 Oct. 28, 2004

Related U.S. Application Data

(60) Provisional application No. 60/469,678, filed on Apr. 28, 2003.

(51) Int. Cl.
  *G06F 17/30* (2006.01)
  *G06F 7/00* (2006.01)
  *G06F 15/16* (2006.01)
(52) U.S. Cl. .................. 707/104.1; 707/3; 707/200; 709/205
(58) Field of Classification Search ............ 707/104.1, 707/3, 200; 709/205
  See application file for complete search history.

(56) References Cited

U.S. PATENT DOCUMENTS

| 6,038,547 | A | 3/2000 | Casto ........................ 705/1 |
| 6,092,050 | A | 7/2000 | Lungren et al. ............ 705/10 |
| 6,236,409 | B1 * | 5/2001 | Hartman .................... 345/629 |
| 6,393,410 | B1 * | 5/2002 | Thompson ................. 705/37 |
| 6,446,053 | B1 | 9/2002 | Elliott ........................ 705/400 |
| 6,529,880 | B1 * | 3/2003 | McKeen et al. ............. 705/17 |
| 6,581,040 | B1 * | 6/2003 | Wright et al. .................. 705/8 |
| 6,625,619 | B1 * | 9/2003 | McClendon et al. ..... 707/104.1 |
| 6,810,383 | B1 * | 10/2004 | Loveland ...................... 705/9 |
| 2003/0101127 | A1 * | 5/2003 | Cornelius .................... 705/37 |
| 2003/0187932 | A1 * | 10/2003 | Kennedy ..................... 709/205 |
| 2004/0117361 | A1 * | 6/2004 | Greer et al. ................... 707/3 |

OTHER PUBLICATIONS

Oracle Certified ProfessionalÔ DBA Certification Exam Guide, Jason Couchman, Osborne McGraw-Hill, 1998 (previously provided).*
Electronic Permitting Systems and How to Implement Them, U.S. Dept. of Housing and Urban Development, Apr. 2002 (previously amended).*
e-Government Plan, "Technology @ Your Fingertips", Irving, Texas, Spring, 2002 (previously provided).*
Automated Permitting with Smart Permits, Arthur E. Hendriques, 1999 APA Proceedings (previously amended).*

* cited by examiner

*Primary Examiner*—Greta Robinson
*Assistant Examiner*—Kuen S. Lu
(74) *Attorney, Agent, or Firm*—Sonnenschein, Nath & Rosenthal LLP; Bryan P. Stanley

(57) ABSTRACT

A network based construction project management system. The system includes network accessible databases of project information including drawings and specifications. The system allows for varying amount of access for various user including general contractors, subcontractors, architects and project owners. The system allows for the effective creation, management and long term accessible storage of project submittals.

23 Claims, 3 Drawing Sheets

CONSTRUCTION PROJECT SUBMITTAL MANAGEMENT

This application claims the benefit of Provisional Application No. 60/469,678 filed Apr. 28, 2003.

BACKGROUND OF THE INVENTION

In the construction industry it is desirable to effectively manage construction projects. In construction a general or prime contractor, herein after general contractor, must manage a variety of ongoing projects. Overlapping the projects is the need to manage relationships with many individuals including project owners, architects, sub-contractors, material suppliers and inspectors.

One of the critical functions in a construction project is to manage the submittal of information and materials to meet specifications. In almost all construction projects it is typical for the architect and engineering design firms to determine a project design and to set the specifications for materials to meet the design parameters. Once the specifications are set, contractors and subcontractors working on the project must make submittals of material specifications to meet the requirements set. A big job for those involved with a construction project is to manage these submittals and to receive timely approvals to requests to keep a construction project moving forward.

In today's construction environment large fines and penalties can be exacted against entities that fail to act in a timely and efficient manner. These fines can lead to litigation associated with when submittals were made and who is responsible for delays ("submittal information"). In many cases stacks of files and paperwork must be stored for years by each entity involved with a project to create a paperwork trail of what happened when ("submittal history"). With fines and the threat of litigation, documentation has become a critical element for the contractor who plans to succeed in managing construction projects.

U.S. Pat. No. 6,038,547 shows construction management software designed to assist in tracking job completion and payments to subcontractors for percentage of work completion. Use of this software by a general contractor would solve some problems associated with project management. This software does not offer assistance to the contractor or others in tracking the process of creating, tracking and storing submittals and submittal information.

U.S. Pat. No. 6,092,050 offers a software to develop bids and to manage the scheduling of projects. Again this software does not propose to manage submittals and does not provide a networked solution to project management.

U.S. Pat. No. 6,446,053 provides a networked system of developing and submitting a bid proposal for a construction project. This system primarily allows the user to develop a project on line and to store it so that contractors can access and bid on the job. The system does not allow the user to create, manage or store submittals concerning material specifications of the project.

U.S. Pat. No. 6,393,410 provides a networked construction management system. The system stores shop drawings and project specifications on line in such a way that professionals in the construction industry can purchase project plans on-line and can submit proposals on the projects. Again the system does not allow for creation, management or storage of submittals made in the process of completing a construction project.

As can be seen there is a need for a networked system that allows the range of construction professionals to be involved in the creation of submittals, the management of those submittals and the storage of submittal information for future use or sale.

SUMMARY OF THE INVENTION

The present invention relates to a networked system that brings together the various professionals and suppliers that might be involved in creating, managing and storing the plurality of material specification submittals associated with a construction project. The system provides for network access to the system for those professionals that might need it. The system provides for variable access depending upon the need an individual might have in a project.

In another aspect of the system it allows for sub-contractors to make submittals over the Internet. Those submittals can be submitted on-line to an architect for approval, denial or for comment. The system can enable users to order materials and work automatically through the system upon approval being received and the system can automatically authorize payments to all parties upon approval of a submittal being received.

In still another aspect of the invention a submittal history is stored. That submittal history is then available to anyone who has access to it during the project and for a time after the project is completed.

These and other advantages of the present invention will become apparent from the detailed description of the invention.

DETAILED DESCRIPTION OF THE DEVICE

Figure 1:
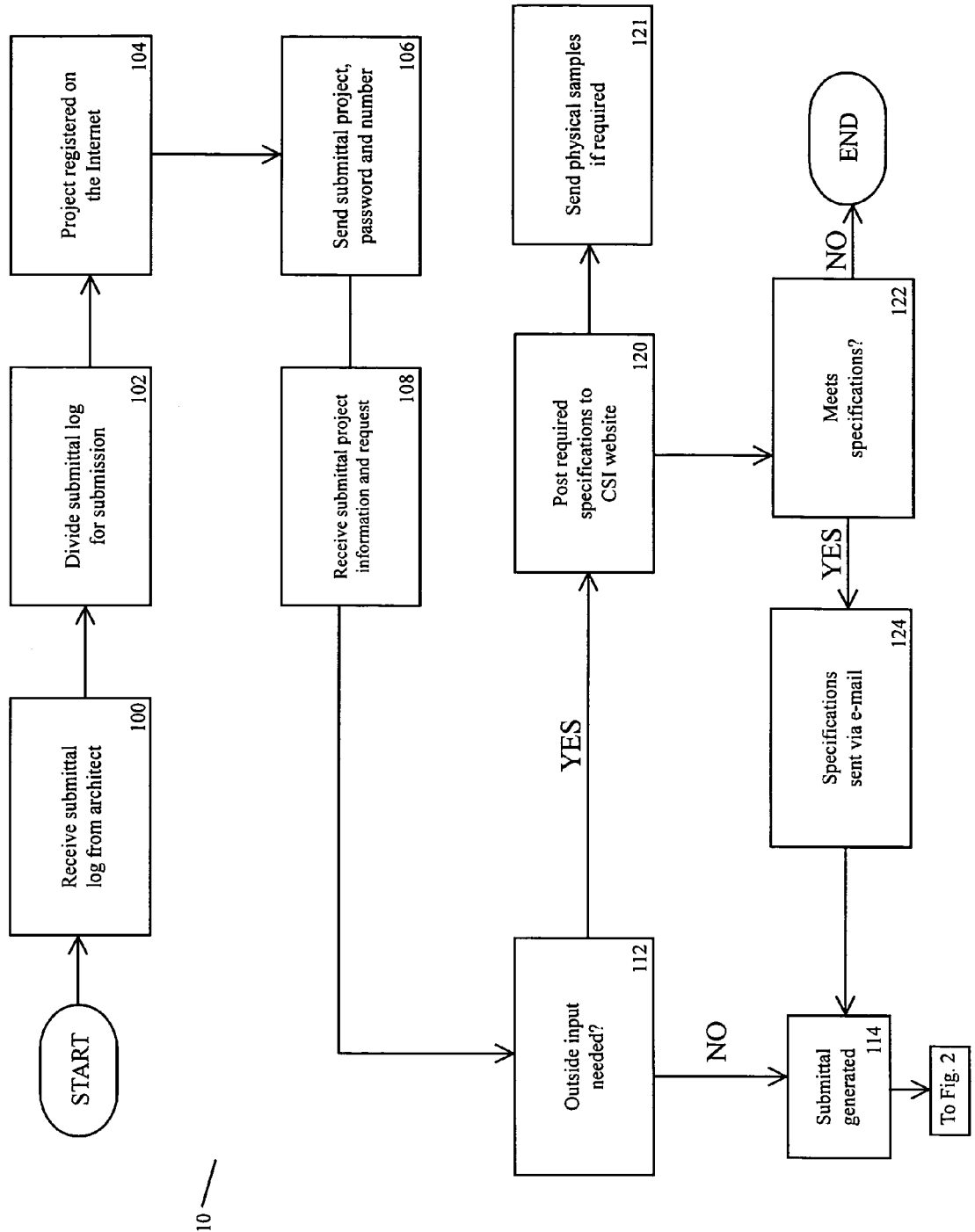
FIG. 1 shows a portion of a flow chart of the submittal management system.

FIG. 1 shows a flow chart of the system 10 for submittal process management, the flow chart of FIG. 1 tracks a single submittal requirement through the system 10. The system 10 begins after an architect has developed a project plan, and a general contractor has bid on and received the contract to build a project. The initial step in the submittal process can be for the architect to send the general contractor the submittal log 100. The submittal log contains all the requirements and specifications that must be met by various components used in a construction project. For a multi-story building the submittal log will contain thousands of requirements for the total building. The submittal log along with project prints, specifications and other contract documents can be transferred electronically to the general contractor who can make those documents available to project professionals selectively through an Internet site.

After the general contractor receives the submittal log, the requirements will be divided up 102 and stored in a network accessible database. The requirements are generally divided along the lines of trades such as plumbing, structural, electrical, heating and ventilating and so forth. The project is then posted 104 to a computer network such as the Internet so that the subcontractors of the various trades can begin to download the submittal requirements for their portion of the project. Each person involved in the project will be emailed a password 106 that will give them selective access to the system 10. In addition to the general and sub contractors (subs) the architect, project owner and others can have selective access. Once a project is posted the subs will receive 108 an email, automatically sent by the system 10, alerting them to the availability of project information. It is important at this stage that the various trades have the ability to move forward on the project quickly.

The subcontractor will then evaluate 112 the need for additional information in order to make a submittal. If no outside assistance is needed, the sub can use the system 10 to go ahead and generate 114 a submittal based on the requirements of their portion of the project. If however additional information is needed, which is often the case, then the sub can go to a variety of specification web sites 120. For example, the sub might use the system 10 post a requirement with a supplier that has access to the system 10. That supplier web site 120 could send the sub information by which the sub could generate the submittal 114, or the system 10 could even post the submittal 114 for the sub. If the supplier is to send info for a submittal to a sub, the system 10 can check 122 that the specifications meet the submittal requirement posted. If in fact the specification check 122 of the supplier's product and the submittal match then the submittal information can be forwarded electronically either to the sub to generate the submittal or the submittal can be sent directly by the supplier for the sub. In situations where a physical sample must be sent 121, such as carpet or paint swatches, the supplier can send these directly to the general contractor, sub, architect and owner as desired. An email can be sent automatically alerting those in the system 10 that physical samples are coming.

Figure 2:
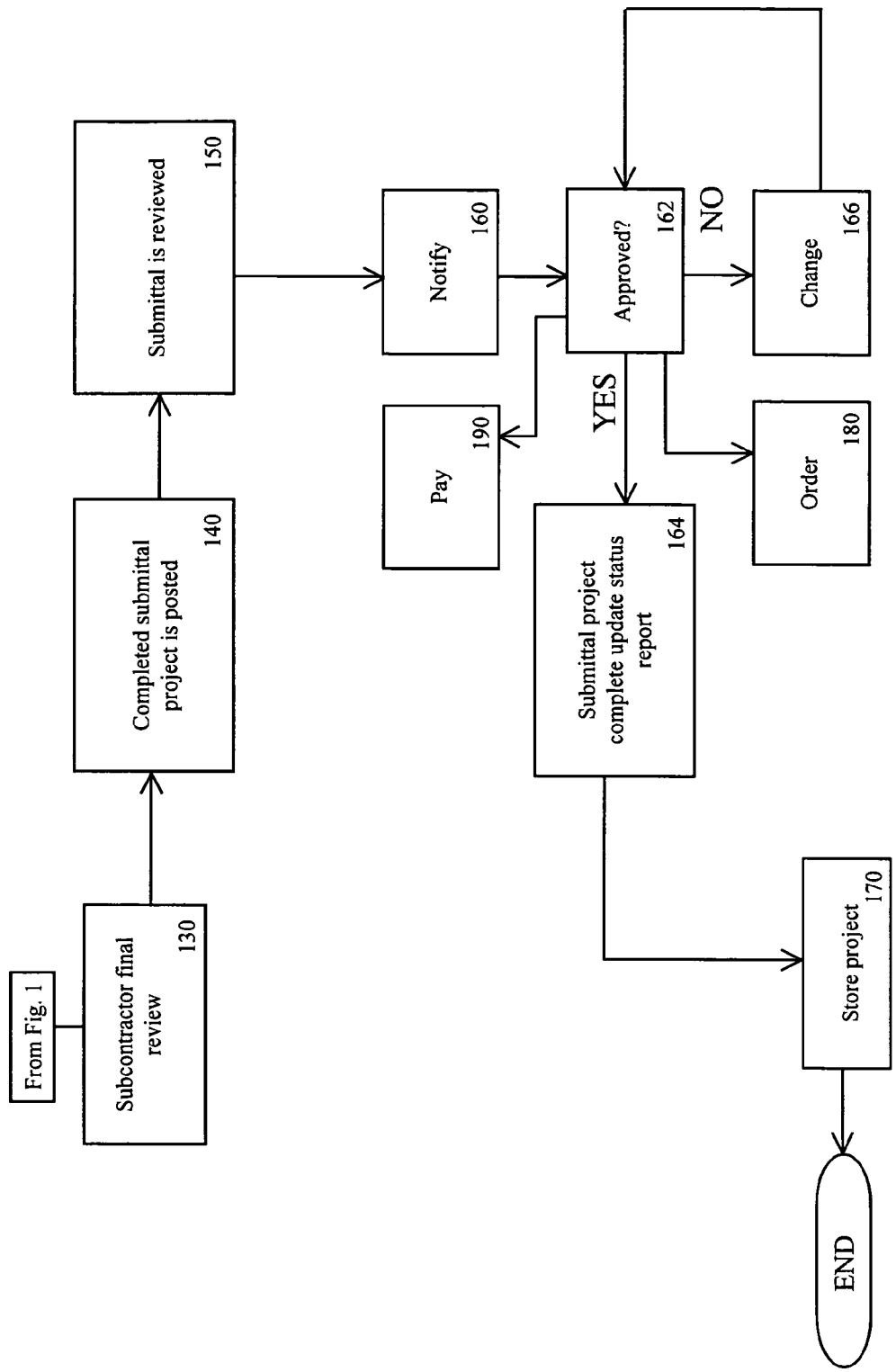
FIG. 2 shows the remaining portion of the flow chart from FIG. 1.

FIG. 2 shows a continuation of the system 10 flowchart from FIG. 1. The subcontractor will conduct a review of the completed submittal 130, and make any changes required. Then the completed submittal can be stored and posted 140 to an Internet web site. Once a submittal is posted 140 it can be reviewed in review process 150 by various professionals involved in the project including typically the architect, general contractor and project owner. During the review process 150 suggestions can be posted to submittal database 600 (FIG. 3) on the web site. For example, the owner might post a question for clarification. After review 150 the next step can be for the submittal to receive approval 162, typically from the project architect or engineer. If not approved then the subcontractor could need to revise the submittal based on comments posted to the electronic web site database. Electronic notice 160 of a submittal acceptance or rejection can be sent via the system 10. Once a submittal is approved, it is submitted to the system 10 and updated as complete 164 in the system 10 and posted as approved on the web site 170 and continues to be available on a selected basis until after the completion of the project. When a project is approved 162, the system 10 can be set to automatically order materials approved, for example an order 180 for carpet that has been approved, could automatically be sent to a supplier. The approval can also automatically approve payment 190 to a subcontractor for materials and work to be done. Once a construction project is complete the submittal archive (submittal history) could be stored and be available for future use on a fee basis. For example if a question arises 2 years after a project is completed then a contractor may still be able to download submittal information for a fee.

Figure 3:
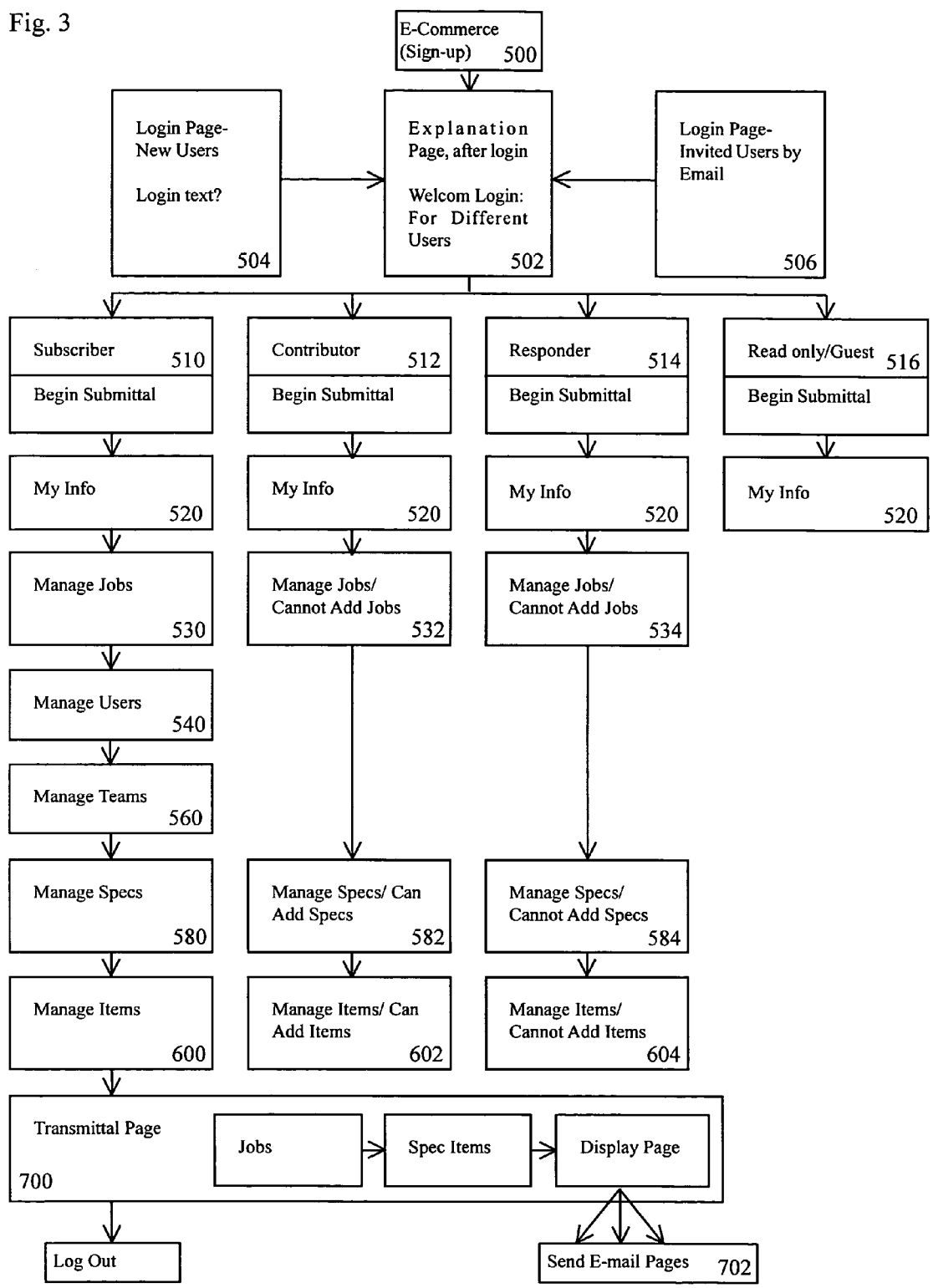
FIG. 3 shows a flow chart of how the system is managed.

FIG. 3 provides a view of the system 10 from the perspective of management of the system 10. To begin the system operation process, a general contractor will signup 500 on the system 10. A fee might be collected from the subscriber 510 at this point via electronic means or the contractor might pay a one time subscription fee and have access to the system 10 for a period of time. The general contractor is then considered by the system to be a subscriber and will then be directed to welcome pages 502, the contractor can at this point enter a project (job) and can enter and store information about the various project users who will have selective access to the project information. New users 504 and those 506 directed to the system 10 by emails will also go through a welcome process that may include instructions for using the system, a password requirement and a fee process.

In the example shown four system user access points are identified a subscriber 510, a contributor 512, a responder 514 and a guest 516 access points. The subscriber 510 access point sets the various levels of access that users would have based on these four choices. In a typical project there might actually be a dozen or more system user access points on a given project but these four access points 510, 512, 514, and 516 show the range of different system and project access that is being contemplated. An access point would typically be a computer having access to a network containing the system 10. In the typical project the subscriber 510 access point would be the general contractor in charge of the entire project. The contributor 512 access point would typically be individuals contributing submittals in completion of project requirements and would normally be trades subcontractors. The responder 514 access point might be a project engineer or architect and the guest 516 access point would typically be a representative of the project owner.

The subscriber 510 has access to enter and store online available information about himself in a my info 520 database. The my info 520 database might include information about the subscriber such as contact information, role in a project or about past projects and credentials. The my info 520 database can be posted in several different jobs so that a single posting will keep several jobs updated. The my info 520 database is a common process that all users will be able to fill out and store on themselves. Thus there may be my info 520 data for the architect, general contractor, subcontractors, owners, suppliers and regulators on a project.

The subscriber 510 has access to manage jobs database 530 and as mentioned a subscriber 510 may have many jobs at various states of completion and ultimately may have an archive of completed jobs as well. So a subscriber 510 can choose to manage jobs and this choice will allow the subscriber 510 to post information about a job that will become available to some or all users. The subscriber 510 can enter people into a job database and by doing so give them access to the job information. The subscriber 510 can enter specifications that apply to the certain job so that users can access information on submittal requirements and so that requirements can be received 108 by subcontractors. This database can contain information such as job drawings. The subscriber 510 can choose to automatically send an email to some or all users concerning changes made in job data. The manage jobs database 530 function also allows the subscriber 510 to add additional jobs to the system 10.

The subscriber 510 has the ability to manage users 540. This function allows the subscriber 510 to track submittals from any user. This function also allows the subscriber 510 to edit information about a user and to enter notes about the user. Notes could be automatically tabulated such as a report on how many jobs a subcontractor has, how many days behind or ahead the contractor is as well as notes on the number of submittals a subcontractor needs to submit on one or all jobs and how many submittals the subcontractor may have that are overdue. This function can automatically contact the subcontractor on the information above such as automatic notification if a submittal is past due.

The manage teams 560 function is similar to the manage user function 540 but allows the subscriber 510 to put together teams that may be on the same job or that may have a common concern outside any given job. An example would be a group of plumbing contractors concerned about a new city ordinance that wish to form a discussion group and post messages automatically distributed to all members of the team. Like the manage users function 540, this manage teams function 560 can automatically notify all members of a team that a submittal is past due.

The manage specification 580 function is where the original requirements for a job are posted to the system 10. This function provides the subscriber 510 with a number of prearranged trade areas into which specifications may be categorized. For example, all electrical requirements would be placed into one category and ultimately these would be available automatically to the subcontractors that would need this information, and automatically sent email can make them aware that the information is available. Requirements can be loaded into each job from a list of standard requirements for a type of job where such a list exists. For example, a particular job may require doors of a certain fire rating and specs to meet these requirements could be pulled automatically from this function by entering the job name or job number.

Manage items database 600 is where the management and completion of the actual submittals occurs. In this function the subscriber 510 can review actual submittals and make comments on submittals sent or create submittals where needed. FIGS. 1 and 2 show the management of an actual submittal document that occurs within this manage items database 600.

The contributor 512 has some of the same capability as the subscriber 510. The contributor 512 has the same my information capability 520. The contributor 512 has limited ability to manage jobs 532 in a portion of the manage jobs database 530, manage specs 582 in a portion of the manage specs database 580 and to manage items 602 in a portion of the manage items database 600. The contributor 512 has no ability to manage users or teams in this embodiment. This has the effect of forcing all correspondence and project information through the subscriber 510 and system 10 so that the subscriber 510 (general contractor) is aware of all aspects of the project process and so that a full record (submittal history) of all project activity is made. An alternative would be to give the contributor some limited ability to manage some users and teams related to their aspect of the overall project. The contributor 512 may need to pay to do this.

The contributors 512 limited ability to manage jobs is essentially the same as that for the subscriber 510 except that the contributor 512 can not add new jobs. The contributor can also manage specs 582. In this function the contributor can add specifications that he is aware of. The contributor 512 can also manage items 602 and this would be where the contributor would actually create and submit a submittal document.

The responder 514 is typically a project engineer or architect and mainly needs access to the system 10 to approve or to disapprove of a submittal. As such the responder 514 can enter my information 520 and can access manage job and manage spec information to get information to allow them to approve or disapprove or make remarks on a submittal under manage items 604. The guest 516 is a read only and as such can not enter any information or manage any project information.

The invention claimed is:

1. A computer implemented method for managing submittal requirements for a construction project, said method comprising the steps of:
    providing a first database containing information related to managing a construction project having stored therein a plurality of requirements for the construction project including a set of required specifications for materials necessary to meet design parameters for the construction project;
    providing a second database containing specific information on system users;
    providing a third database containing information on submittal documents to be completed and approved as part of a project, said submittal documents including a set of actual material specifications to meet said set of required specifications;
    providing a computer network including a plurality of user computer access points,
        said network including a subscriber access point for use by a subscriber to said system, said subscriber access point having full access to enter, to read and to change information in said first, second and third databases, wherein said subscriber changes information in said first database by providing at least said set of required specifications,
        said network further including a contributor access point for use by a contributor to said submittal documents, said contributor access point having access to read information in said first and second databases and access to enter, read and change information in said third database to provide said set of actual material specifications to meet said set of required specifications,
        said network further including a responder access point for use by a responder, said responder access point having access to read information in said first, second and third database and having the ability to approve said submittal documents;
    posting a completed submittal, including said set of actual material specifications, to said network for review by said responder following completion by said contributor;
    approving said completed submittal electronically by said responder via said network; and
    archiving completed submittal documents for future retrieval.

2. The method of claim 1 wherein said subscriber access point can issue passwords to give access to information to said contributor access point and said responder access point.

3. The method of claim 1 wherein automatic authorization of payment can be provided via said network.

4. The method of claim 1 wherein said network comprises the Internet.

5. A computer network implemented method providing for managing preparation of submittal documentation for a construction project said method comprising the steps of:
    providing a first database for receiving and storing information related to preparing a submittal document for a construction project, receiving therein requirements for the construction project submittal, including a set of required specifications for materials necessary to meet design parameters for the construction project;

providing a second database for storing information about system users; providing a third database for storing, retrieving and displaying submittal documents to be completed and approved as part of the construction project, said submittal document including a set of actual material specifications to meet said set of required specifications;

providing for a computer network including a plurality of user computer accessible points for accessing said first, second and third databases, wherein said databases are controlled by a subscription service provider;

receiving information via said computer network from a subscriber access point having full access to read and to change information in said first, second and third databases, wherein said subscriber access point provides information to change information in said first database by providing at least said set of required specifications;

receiving information via said computer network from a contributor access point having access to read only information in said first and second databases and access to read and change information in said third database to provide said set of actual material specifications to meet said set of required specifications; and archiving completed submittal documents by said subscription service provider for future retrieval.

6. The method of claim 5 including the step of receiving information from a responder access point having the ability to read only information in said first, second and third database and said network having the ability to receive approval of said submittal documents from said responder access point such that automatic authorization of project payments can be provided via said computer network.

7. The method of claim 5 wherein a user of said subscriber access point is a prime contractor on said construction project.

8. The method of claim 6 wherein said requirements for the construction project include project drawings.

9. The method of claim 6 wherein a user of said responder access point is an architect or a project engineer on said construction project.

10. The method of claim 6 wherein said project payments are for materials required in said submittal document.

11. The method of claim 6 further comprising the step of automatically sending a message via said computer network to said contributor when information is received.

12. The method of claim 5 wherein a user of said contributor access point is a subcontractor on said construction project.

13. The method of claim 5 wherein said computer network comprises the Internet.

14. A computer network system comprising:

a first database for receiving information related to a submittal document for a construction project, receiving therein a plurality of requirements for the construction project submittal, including a set of required specifications for materials necessary to meet design parameters for the construction project;

a second database for system users that receives a plurality of specific information about system users;

a third database for submittal documents to be completed and approved as part of the construction project, said submittal document including a set of actual material specifications to meet said set of required specifications;

a computer network including a plurality of user computer accessible points for accessing said first, second and third databases, wherein said databases are controlled by a subscription service provider;

a subscriber access point having full access to read and to change information in said first, second and third databases, wherein said subscriber access point changes information in said first database by providing at least said set of required specifications;

a contributor access point having access to read only information in said first and second databases and access to read and change information in said third database such that said contributor can complete said submittal document by providing said set of actual material specifications to meet said set of required specifications and submit said submittal document via said computer network for approval; and archiving completed submittal documents by said subscription service provider for future retrieval.

15. The computer network system of claim 14, wherein a user of said subscriber access point is a prime contractor on said construction project.

16. The computer network system of claim 14, including a responder access point having the ability to read only information in said first, second and third database and said network having the ability to receive approval of said submittal documents from said responder access point such that automatic authorization of project payments can be provided via said computer network.

17. The method of claim 14 wherein said computer network comprises the Internet.

18. A computer network implemented method providing for managing preparation and storage of submittal documentation for a construction project said method comprising the steps of:

providing a first database for receiving and storing information related to preparing a submittal document for a construction project, receiving therein requirements for the construction project submittal including a set of required specifications for materials necessary to meet design parameters for the construction project;

providing a second database for storing information about system users;

providing a third database for storing, retrieving and displaying submittal documents to be completed and approved as part of the construction projects, said submittal document including a set of actual material specifications to meet said set of required specifications;

providing for a computer network including a plurality of user computer accessible points for accessing said first, second and third databases, wherein said databases are controlled by a subscription service provider;

receiving information from at least one subscriber access point having full access to read and to change information in said first, second and third databases, wherein said information changes information in said first database by providing at least said set of required specifications;

receiving information from at least one contributor access point having access to complete said submittal documents by providing said set of actual material specifications to meet said set of required specifications; and archiving completed submittal documents by said subscription service provider for future retrieval.

19. The method of claim 18 including the step of notifying automatically said subscriber and said contributor access points upon approval of a submittal document through said computer network.

20. The method of claim 18 wherein said at least one contributor access point has access to read and change information in said first and second databases.

21. The method of claim 18 further comprising the step of receiving approval of said submittal documents such that automatic authorization of project payments can be provided via said computer network.

22. The method of claim 21 wherein payment requests are received from said contributor. internet.

23. The method of claim 18 wherein said computer network comprises the Internet.

* * * * *

UNITED STATES PATENT AND TRADEMARK OFFICE
CERTIFICATE OF CORRECTION

| | | |
|---|---|---|
| PATENT NO. | : 7,062,514 B2 | Page 1 of 1 |
| APPLICATION NO. | : 10/693590 | |
| DATED | : June 13, 2006 | |
| INVENTOR(S) | : Elbert Harris | |

It is certified that error appears in the above-identified patent and that said Letters Patent is hereby corrected as shown below:

Column 8, line 49: the word "projects" should be changed to --project--

Column 10, line 6: delete the word "internet" at the end of the line

Signed and Sealed this

Sixteenth Day of January, 2007

JON W. DUDAS
*Director of the United States Patent and Trademark Office*

(12) INTER PARTES REEXAMINATION CERTIFICATE (552nd)
United States Patent
Harris

(10) Number: US 7,062,514 C1
(45) Certificate Issued: Mar. 7, 2013

(54) CONSTRUCTION PROJECT SUBMITTAL MANAGEMENT

(75) Inventor: Elbert Harris, Leawood, KS (US)

(73) Assignee: Elbert Harris Living Trust, Leawood, KS (US)

Reexamination Request:
No. 95/001,478, Dec. 23, 2010

Reexamination Certificate for:
Patent No.: 7,062,514
Issued: Jun. 13, 2006
Appl. No.: 10/693,590
Filed: Oct. 24, 2003

Certificate of Correction issued Jan. 16, 2007.

Related U.S. Application Data

(60) Provisional application No. 60/469,678, filed on Apr. 28, 2003.

(51) Int. Cl.
*G06F 17/30* (2006.01)
*G06F 7/00* (2006.01)
*G06F 15/16* (2006.01)

(52) U.S. Cl. ... 707/999.003; 707/999.104; 707/999.107; 707/999.2; 709/205

(58) Field of Classification Search .................. None
See application file for complete search history.

(56) References Cited

To view the complete listing of prior art documents cited during the proceeding for Reexamination Control Number 95/001,478, please refer to the USPTO's public Patent Application Information Retrieval (PAIR) system under the Display References tab.

*Primary Examiner* — Mark Sager

(57) ABSTRACT

A network based construction project management system. The system includes network accessible databases of project information including drawings and specifications. The system allows for varying amount of access for various user including general contractors, subcontractors, architects and project owners. The system allows for the effective creation, management and long term accessible storage of project submittals.

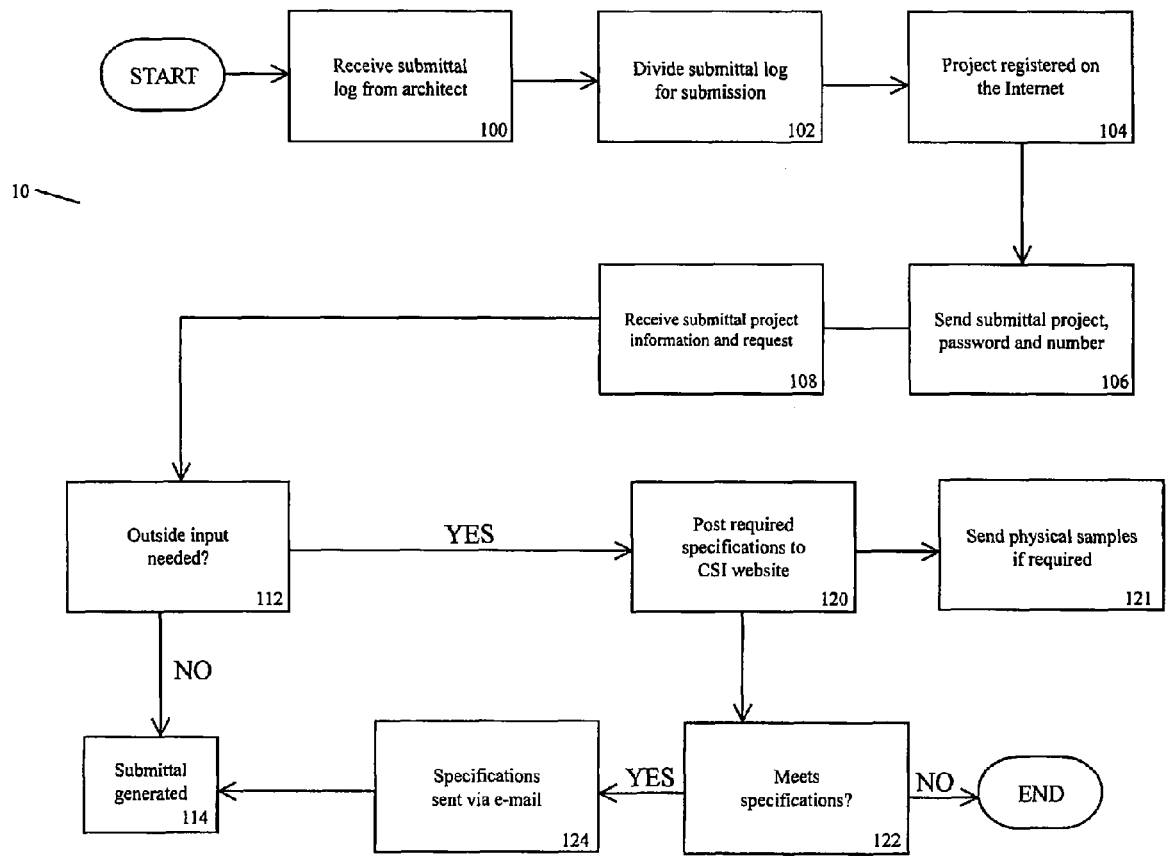

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-23 are cancelled.

* * * * *